United States Patent Office 2,806,857
Patented Sept. 17, 1957

2,806,857

NON-CROSS-LINKED STARCH ETHERS AND METHOD OF PRODUCING SAME

Eugene F. Paschall, Orland Park, Ill., assignor to Corn Products Refining Company, New York, N. Y., a corporation of New Jersey No Drawing. Application April 22, 1954,
Serial No. 425,028

7 Claims. (Cl. 260—333.3)

This invention relates to an improved method of preparing starch ethers. More particularly, it relates to a method of preparing starch ethers with improved properties from epihalohydrin-sulfite addition product.

Epichlorohydrin has been used in the preparation of starch ethers but these prior art products are cross-linked to the extent that they are not gelatinizable except under extreme conditions, e. g., strong alkali treatment. It is the main object of this invention to prepare a starch ether from epihalohydrin-sulfite addition product which is free of cross-linking or is so little cross-linked that it may be gelatinized readily by cooking with water. Such starch ethers have unusual properties, as will appear hereinafter, which make them valuable in certain applications. Further objects will appear hereinafter.

I have discovered that if the epihalohydrin-sulfite addition product is prepared under carefully controlled conditions, the cross-linking impurities are so limited as to impart certain desirable properties to the starch ether. I have further discovered that cross-linking with epihalohydrin can be avoided by first vacuum distilling or solvent extracting with, for example, diethyl ether, the cross-linking impurities from the epihalohydrin-addition product after the reaction between epihalohydrin and sulfite is substantially complete before such addition product is reacted with starch.

In carrying out my invention for the preparation of starch ethers from epihalohydrin-addition products wherein some cross-linking with epihalohydrin is desired, the addition product may be prepared by reacting epihalohydrin and a basic inorganic sulfite, such as sodium sulfite, until the reaction is complete; the sulfite being present in excess of the epihalohydrin by an amount up to 0.17 mole, per mole of epihalohydrin. The temperature should not exceed 20° C. and preferably should be below 5° C. However, if a mixture of bisulfite and a catalytic amount of sulfite is used in place of the sulfite, the temperature may be as high as reflux temperature of the aqueous reaction medium.

After the epihalohydrin-sulfite addition product has been prepared, it is reacted with starch in the presence of an alkaline medium, such as alkali metal hydroxides, alkaline earth oxides and hydroxides, quaternary ammonium bases. When the addition product has been prepared from epihalohydrin and bisulfite in the presence of catalytic amounts of sulfite, it reacts with an equivalent amount of alkaline substance. The resultant products reacts with starch in the presence of an alkaline catalyst to form the starch ether, the amount of catalyst required being 0.03 to 0.2 mole per anhydroglucose residue of starch. When only the basic sulfite is used in the formation of the addition product, the amount of catalyst used in the preparation of starch ether may be 0.03 to 0.2 mole per molar weight of anhydroglucose residue. Reaction of the epihalohydrin addition product may be carried out using either gelatinized or ungelatinized starch. If starch is derivatized in the ungelatinized or "granule" state, any temperature below the gelatinizing temperature may be used.

To prevent swelling of the starch granules at higher temperatures, salts, e. g., NaCl, $Na_2SO_4$, $CaCl_2$, $Na_2CO_3$, etc., may be added in concentrations ranging up to that required to saturate the solution. Such saturated salt solutions may be used as the reaction medium for the etherification and permit the use of concentrations of alkali catalyst as high as 0.2 mole per mole of anhydroglucose residue without gelatinizing the starch granules. With lower alkali concentrations, reaction temperature of 70 to 80° C. may be employed with such saturated salt solutions to increase the reaction rate.

The inorganic sulfites which are suitable for purposes of my invention are the water soluble basic sulfites, and bisulfites, such as sodium and potassium sulfites and bisulfites.

Epichlorohydrin is the preferred epihalohydrin but epibromohydrin also gives satisfactory results.

My invention is applicable to all starches, e. g., corn, potato, tapioca, sago, rice, wheat, waxy maize, and grain sorghum. The starch may be raw or modified as with acid, oxidizing agents, and the like, and it may be in gelatinized or ungelatinized form.

The non-cross-linked products produced by the process of my invention form clear, viscous pastes which are long and do not set-back on prolonged standing. The slightly cross-linked products form pastes which are extremely viscous and short and do not setback on prolonged standing.

The invention will be further illustrated by examples which are intended as typical and informative only and in no way limiting the invention.

Example 1

This example illustrates the preparation of a non-cross-linked starch sulfonate ether from the epichlorohydrin-sulfite addition product.

0.2 mole (18.5 g.) of epichlorohydrin and 0.2 mole (25.2 g.) of anhydrous sodium sulfite were mixed with 200 ml. of water and the mixture agitated for one hour at 5° C. The resulting solution was concentrated to a salt residue by vacuum distillation at 47° C. and 20 mm. pressure, collecting volatiles in a Dry Ice trap. A slurry containing 162 g. (dry basis) of unmodified starch, 230 ml. of water, 10 g. NaCl and 0.05 mole (2.0 g.) NaOH was added to the residue and the mixture stirred for 20 hours at 40° C. The product was neutralized, filtered and washed with water. The D. S. was 0.03 and the percent sulfur 0.58. The product when cooked in water has increased water holding capacity, increased clarity and paste stability when compared to cooked pastes of the original starch.

Example 2

This example illustrates the preparation of a very slightly cross-linked starch sulfonate ether from the epichlorohydrin-bisulfite addition product.

0.3 mole (31.2 g.) of $NaHSO_3$, 0.05 mole (6.3 g.) of $Na_2SO_3$, and 0.3 mole (27.8 g.) of epichlorohydrin were mixed with 250 ml. of water and stirred for 3 hours at 15 to 20° C. 162 grams (dry basis) of unmodified starch was slurried with this solution and 0.35 mole (14 g.) of NaOH in the form of a 1.0 N solution was added gradually over a period of 30 minutes; the mixture was then stirred for 17 hours at 40° C. The product was neutralized with HCl, filtered, washed with a 50 percent water methyl alcohol mixture and air dried. The D. S. was 0.044 and the percent sulfur 0.81. The product gelatinized in boiling water to form a highly viscous, clear salve-like paste.

Example 3

This example illustrates the preparation of a non-cross-linked starch sulfonate ether from the epichlorohydrin-bisulfite addition product.

0.1 mole (10.4 g.) of NaHSO₃, 0.01 mole (1.3 g.) Na₂SO₃ and 0.1 mole (9.2 g.) epichlorohydrin were mixed with 100 ml. of water and the mixture stirred for 3 hours at 20° C. The volatiles from this solution were vacuum distilled at 47° C. and 30 mm. pressure until a solid residue remained. A starch slurry consisting of 162 g. (dry basis) of unmodified starch, 200 ml. of water and 10 g. of NaCl was added to the solid residue. 0.15 mole (6.0 g.) of NaOH dispersed in 150 ml. of water was added over a period of 15 minutes and the mixture stirred for 17 hours at 47° C. The product was neutralized with HCl, filtered, washed and air dried. The D. S. was 0.024 and the percent sulfur 0.45. The product gelatinized in boiling water to form a long, viscous, clear paste which did not set-back on standing for 3 weeks.

I claim:

1. The process of preparing non-cross-linked starch ethers which comprises reacting equimolar quantities of epichlorohydrin with the alkali metal sulfite, the temperature of the reaction not exceeding about 20° C., removing unreacted epichlorohydrin, and reacting the resultant epichlorohydrin-sulfite addition product with starch in contact with an alkaline catalyst.

2. The process according to claim 1 wherein the amount of catalyst ranges from 0.03 to 0.2 mole per anhydroglucose residue.

3. The process of preparing non-cross-linked starch ethers which comprises reacting equimolar quantities of epichlorohydrin and an alkali metal bisulfite in contact with an amount of an alkali metal sulfite up to about 20 percent of the bisulfite, the temperature of the reaction not exceeding about 20° C., removing unreacted epichlorohydrin, and reacting the epichlorohydrin sulfite addition product with an equimolar quantity of an alkali metal hydroxide, then reacting the resulting product with starch in contact with 0.03 to 0.2 mole of an alkaline catalyst per mole of anhydroglucose residue of the starch; said catalyst being selected from the group consisting of alkali metal hydroxides, alkaline earth oxides and hydroxides, and quaternary ammonium bases.

4. The process of preparing slightly cross-linked starch ethers which comprises reacting epichlorohydrin and an alkali metal sulfite, the sulfite being present in excess of the epichlorohydrin by an amount up to 0.17 mole, per mole of epichlorohydrin, the temperature of the reaction not exceeding about 20° C., and reacting the resultant epichlorohydrin sulfite addition product with starch in contact with 0.03 to 0.2 mole of an alkaline catalyst per anhydroglucose residue of the starch; said catalyst being selected from the group consisting of alkali metal hydroxides, alkaline earth oxides and hydroxides, and quaternary ammonium bases.

5. The process of preparing a slightly cross-linked starch ether which comprises reacting epichlorohydrin and a water soluble inorganic bisulfite, the bisulfite being present in excess of the epichlorohydrin by an amount up to 0.17 mole, per mole of epichlorohydrin, and an amount of an alkali metal sulfite up to about 20 percent of the bisulfite, the temperature of the reaction being up to the reflux temperature of the mixture, and reacting the epichlorohydrin sulfite addition product with an equimolar quantity of an alkali metal hydroxide, then reacting the resultant product with starch in contact with 0.03 to 0.2 mole of alkaline catalyst per mole of anhydroglucose residue of the starch; said catalyst being selected from the group consisting of alkali metal hydroxides, alkaline earth oxides and hydroxides, and quaternary ammonium bases.

6. Product according to the process of claim 3.

7. Product according to the process of claim 5.

References Cited in the file of this patent

UNITED STATES PATENTS

| | | |
|---|---|---|
| 2,148,554 | Hentrich et al. | Feb. 28, 1939 |
| 2,516,633 | Kesler et al. | July 25, 1950 |
| 2,524,400 | Shoene et al. | Oct. 3, 1950 |
| 2,580,351 | Grassie | Dec. 25, 1951 |
| 2,626,257 | Caldwell et al. | Jan. 20, 1953 |

UNITED STATES PATENT OFFICE
CERTIFICATE OF CORRECTION

Patent No. 2,806,857                                        September 17, 1957

Eugene F. Paschall

It is hereby certified that error appears in the printed specification of the above numbered patent requiring correction and that the said Letters Patent should read as corrected below.

Column 3, line 23, after catalyst and before the period insert -- ; said catalyst being selected from the group consisting of alkali metal hydroxides, alkaline earth oxides and hydroxoides, and quaternary ammonium bases --.

Signed and sealed this 3rd day of December 1957.

(SEAL)
Attest:

KARL H. AXLINE
Attesting Officer

ROBERT C. WATSON
Commissioner of Patents